Figure 1:
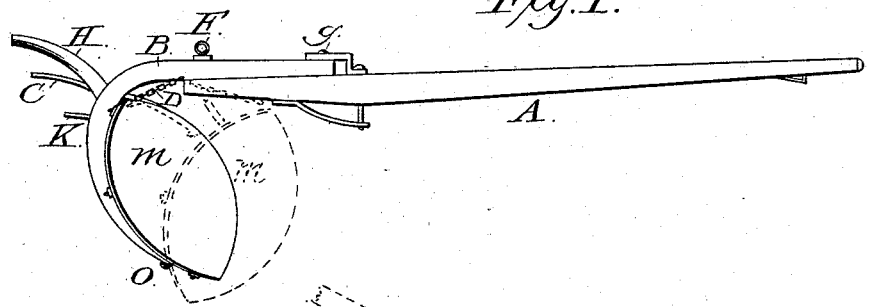

(No Model.)

J. JOHNSON.
COMBINED DIRT SCRAPER, LEVELER, AND DITCHING MACHINE.

No. 283,113. Patented Aug. 14, 1883.

Witnesses:
H. McDonald
J. J. Parker.

Inventor:
Jeremiah Johnson
per Jas. T. Drummond
Atty.

United States Patent Office.

JEREMIAH JOHNSON, OF ST. JOSEPH, MISSOURI.

COMBINED DIRT-SCRAPER, LEVELER, AND DITCHING-MACHINE.

SPECIFICATION forming part of Letters Patent No. 283,113, dated August 14, 1883.

Application filed March 14, 1883. (No model.)

*To all whom it may concern:*

Be it known that I, JEREMIAH JOHNSON, a citizen of the United States, residing at St. Joseph, in the county of Buchanan and State of Missouri, have invented a new and useful combined machine for scraping and transporting dirt in making excavations and embankments, for leveling or smoothing the surface of the ground, and especially new grades or embankments, and for making ditches or surface-drains; and I do hereby declare that the following is a full, clear, and exact description of my invention, which will enable others skilled in the art to which it appertains to understand the same.

Heretofore dirt-scrapers for transporting dirt by a dragging process on the ground have been made with metal plates or boards arranged in a vertical position and attached to a tongue, and provided with handles for manipulating them by the attendant bearing down on the handles to cause them to take into dirt for scraping, and lifting the machine to free it from its load of dirt. Other scrapers have been made by using a plate of metal curved transversely and hung in a diagonal manner to operating mechanism arranged on wheels, which device, however, simply removes loose earth sidewise by a sliding process the distance of the pitch of said plate.

The object of my invention is to provide a machine capable of being arranged to accomplish the different purposes above named by simply changing the position of a few of its elementary parts, and one that is cheap in its construction, easily handled, and effective in its working in all of its operations.

My invention consists in a transversely-curved metal plate the size required for the implement, it being connected by pivotal attachments to the extreme rearward and downward curved ends of an adjustable bail, constituting draft-bars, said pivotal attachments being on the convex side of said curved plate, at or near its middle crosswise, so that said curved plate may have a rotating reciprocal movement on said pivotal couplings. Said bail is also pivoted at its center or forward short bend to a tongue, so that it may be swung sidewise for converting the implement into a ditching-machine. It is also provided with a curved cross bar or plate connecting the two sides or prongs of the bail or draft-bars, which cross-plate is provided with holes for coupling it with the hind end of the tongue, so that the scraper-plate will either stand at right angles with said tongue for scraping or leveling purposes, or so as to stand obliquely on either side for ditching. It further consists in detachable end plates for attaching to the ends of said curved plate while being used as a scraper for removing dirt, to prevent it escaping sidewise therefrom, all of which I will proceed to more fully describe by the use of the accompanying drawings, which constitute part of this specification, of which—

Figure 2:
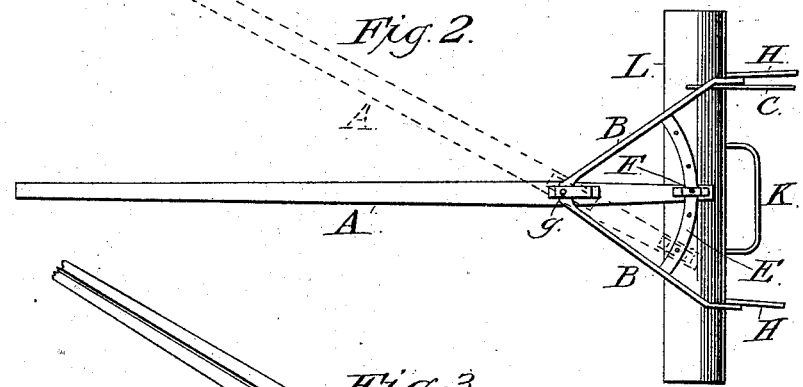
Figure 4:
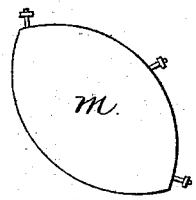
Figure 3:
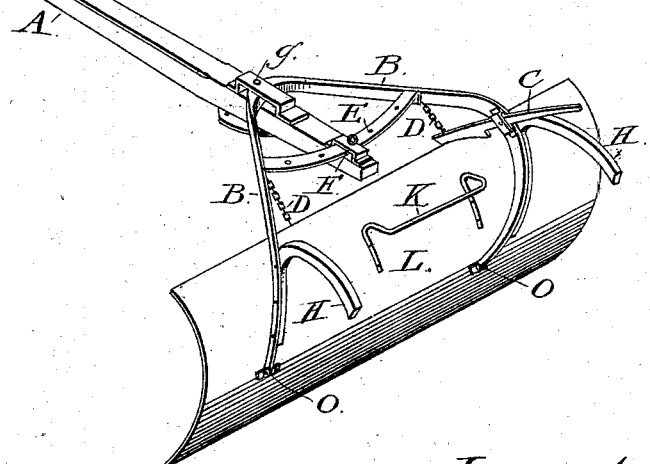

Figure 1 is a side elevation of the machine arranged as a scraper for moving dirt, having the end plates attached thereto. It also, by dotted lines, shows the position occupied while dumping a load and traveling empty. Fig. 2 is a plan view of the same, showing also by dotted lines a position of the tongue occupied when being used as a ditching-machine. Fig. 3 is a perspective of the machine in position for scraping and removing dirt, but having the end plates detached; and Fig. 4 shows one of said detached end plates.

Similar reference-letters indicate like parts throughout the figures, of which—

A represents the tongue of the machine; B, the draft-bars or bail, which is doubly curved, as shown at Fig. 3, and is pivoted to the tongue at its center or forward short bend, and to the convex side of the scraper-plate L by hinge-connections at its ends, as shown also at said figure. H are handles, shaped so as to fit the curved ends of said draft-bars B, where and to which they are rigidly attached. They are used for manipulating the machine, and serve also to strengthen and stiffen said draft-bars where thus attached. An additional loop-handle, K, is also attached to the hind or convex side of the plate L, as a means of more conveniently handling the same in rotating it backward after dumping, and is used in connection or harmony with the handles H.

C is a retaining catch-lever, pivoted within a loop attached to one of the draft-bars, so that its catches will automatically take over the upper edge of the scraper-plate, and hold it either in proper position for scraping dirt for removal to another locality, for scraping out a ditch, or for leveling or smoothing the surface of the ground, by letting different catches on said lever take over said edge. For releasing the hold of said catches, the attendant presses downward on the rearward-projecting handle of said lever, thereby raising its forward part, so as to free it from said plate.

D are stay-chains, having one end attached to the upper edge of the scraper-plate and the other to the draft-bars at points forward of said plate, for supporting said plate when heavily loaded, and for limiting its forward rotating or reciprocal movement when dumping its load.

E is a plate or flat bar, curved as an arc of a circle, serving as a cross connecting bar or plate to the draft-bars, or the two prongs of the double-curved draft-bail B, it being provided with holes in it at fixed intervals, through which a coupling-pin, F, is inserted, as well as also through a hole in the end of the tongue A, and a guide-loop attached thereto, as a means of holding the scoop at proper angles with said tongue to accomplish the objects set forth. For scraping and leveling, said pin will be in the middle hole, as shown by the position of the parts represented in full lines at Fig. 2; and for making ditches it will be placed in one of the outer holes, as shown by the position of the tongue relative to the other parts, as represented by dotted lines in said figure. Said coupling for ditching may be made at either outer hole, thereby giving a sloping angle on either side to the scraper-plate, suitable for conveying dirt laterally by a sliding process, by means of a forward motion being given to it. By changing said pin so as to reverse said angular attachment the implement may be made to scrape or discharge dirt on the same side of the ditch in moving either way in its construction.

m, Fig. 4, is one of the end plates above mentioned, which are to be attached, one at either end, to the plate L when the implement is to be used as a scraper for moving dirt in the construction of road-grades and such like work, so as to prevent the dirt from escaping sidewise while in transit. Said end plates are fastened in place by inserting the bolts attached to their edges through apertures in the ends of said plate, and tightening them by means of taps on their ends. O are the hinges or pivotal attachments of said draft-bars to the plate L, and may be made in any of the known ways of the art.

The operations of the machine are as follows: For using it as a scraper for transporting dirt, the end plates, m, Fig. 4, are attached, and the plate L is rotated backward, so that its upper edge will be caught and held by the catch on the lever C nearest the pivot, in which position it will fill with dirt and convey it to a place of deposit by dragging the machine forward over dirt sufficiently loose to allow it to take hold. It is dumped by the attendant pressing downward on the handle of said catch-lever, thereby releasing the upper edge of the plate L, when it rotates forward by means of friction with the ground, thereby discharging its load. In said position the end plates, m, serve as runners, upon which it may be dragged empty. It is thus returned, after dumping, for another load. It is readjusted for filling by the attendant taking hold of the handle K, in connection with one of the handles H, and rotating it backward until the catch on the lever C again automatically takes over its upper edge, as before. For using it as a leveling device to smooth the surface of the ground, the end plates, m, are taken off, and the upper edge of the plate L is caught by the outer hook or catch on the lever C, in which position it is dragged over the dirt to be smoothed or leveled. For using it to scrape out ditches, the end plates, m, are likewise taken off, and the plate L having its upper edge held by the catch-lever C, the tongue A is shifted so that it will stand in a deflected angle with said scraping-plate by swinging the bail or draft-bars B sidewise on its coupling-pivot g, and by changing the coupling-pin F to one of the outer holes in the curved bar E, when, by means of a forward movement, the dirt caught by said scraping-plate slides outward past its outer and rearward end, thereby depositing it on the bank of the ditch being formed. Said movement and operation is repeated until the required depth of ditch is attained.

Having thus described my invention, what I claim as new, and desire to secure by Letters Patent, is—

1. The combination of the curved scraper-plate L, pivotally hinged to the ends of downward-curved draft-bars, the draft-bars B, pivoted to the tongue A, so as to be adjustable sidewise, the curved cross-bar E, tongue A, coupling-pin F, catch-lever C, stay-chains D, and handles H and K, all arranged substantially as herein shown, for the purposes specified.

2. In combination with a transversely-curved scraper-plate having a rotating reciprocal movement, the detachable end plates, m, arranged substantially as shown, for the purposes specified.

3. In combination with a transversely-curved scraper-plate having a rotating reciprocal movement, and provided with hinge-coupling attachments on its convex side, and the tongue A, the draft-bail consisting of the draft-bars B, being arranged to adjust sidewise by means of its pivotal connection with said tongue, the plate E, and coupling-pin F, said bail being provided with hinge-couplings at its rear drooping ends, for coupling it with said plate, substantially as shown, for the purpose specified.

4. In combination with the adjustable bail constituting the draft-bars of a scraper, having a transversely-curved scraper-plate, the tongue A and coupling-pin F, the curved connecting-plate E, provided with coupling-holes at fixed intervals, suitably arranged for holding said scraper either at right angles with the tongue, or at a deflected angle suitable for scraping ditches, substantially as shown and specified.

JEREMIAH JOHNSON.

Witnesses:
S. D. COWAN,
W. A. STEARNS.